(12) United States Patent
Liu et al.

(10) Patent No.: US 10,319,546 B2
(45) Date of Patent: Jun. 11, 2019

(54) WIRELESS SWITCH

(71) Applicant: XIAMEN ECO LIGHTING CO. LTD., Xiamen (CN)

(72) Inventors: Danqing Liu, Xiamen (CN); Jiaqing Zhuang, Xiamen (CN)

(73) Assignee: XIAMEN ECO LIGHTING CO. LTD., Xiamen (CN)

(*) Notice: Subject to any disclaimer, the term of this patent is extended or adjusted under 35 U.S.C. 154(b) by 151 days.

(21) Appl. No.: 15/444,318

(22) Filed: Feb. 27, 2017

(65) Prior Publication Data
US 2018/0204696 A1 Jul. 19, 2018

(30) Foreign Application Priority Data
Jan. 17, 2017 (CN) .......... 2017 1 0035035

(51) Int. Cl.
H01H 47/00 (2006.01)
H01H 47/02 (2006.01)
H02J 7/00 (2006.01)
H05B 37/02 (2006.01)
H02J 7/34 (2006.01)

(52) U.S. Cl.
CPC .......... *H01H 47/002* (2013.01); *H01H 47/02* (2013.01); *H02J 7/0068* (2013.01); *H05B 37/0272* (2013.01); *H02J 7/345* (2013.01); *H05B 37/0209* (2013.01); *Y02B 20/48* (2013.01)

(58) Field of Classification Search
CPC .. H01H 47/002; H01H 47/02; H05B 37/0272; H05B 37/0209; H02J 7/0068; H02J 7/345
See application file for complete search history.

(56) References Cited

U.S. PATENT DOCUMENTS

2014/0265880 A1* 9/2014 Taipale ............. H05B 37/0263
 315/158
2015/0189726 A1* 7/2015 Spira .................. H05B 33/0845
 315/302

FOREIGN PATENT DOCUMENTS

JP 08172734 A * 7/1996

* cited by examiner

Primary Examiner — Jared Fureman
Assistant Examiner — Michael J Warmflash
(74) Attorney, Agent, or Firm — Chun-Ming Shih

(57) ABSTRACT

A wireless switch is provided. The wireless switch comprises a mechanical switch, an electronic switch module, a charger module, a power storage module, and a wireless control module. The electronic switch module is connected to the mechanical switch in parallel. When one of the mechanical switch and the electronic switch module is turned on, the power storage module is charged through the charger module.

13 Claims, 4 Drawing Sheets

WIRELESS SWITCH

FIELD OF THE INVENTION

The invention is related to single wire switch, in particular to the field of wireless single hot wire smart switch.

BACKGROUND OF THE INVENTION

A single hot wire switch can be a wireless switch, but the wireless functions need electrical power to work normally. In the past, when the wireless switch is turned off, a wireless control module in the wireless switch gets electrical power supply from an electrical current flowing through a load, such as a light. If the electrical current is too small, the wireless control module cannot work. If the electrical current is too large, the light may have blinking or flickering effects, or dull glow when the light is an incandescent lamp. High resistance power saving lights and LED lights are even more sensitive to the electrical current. Therefore, there is a strong need for a new design of a wireless single hot wire smart switch to overcome the above problems.

SUMMARY OF THE INVENTION

One objective of the invention is to provide a wireless single hot wire smart switch, wherein the wireless control module in the wireless single hot wire smart switch can be wirelessly connected to cell phones easily and the wireless single hot wire smart switch can be incorporated into a wireless smart network system, in which cell phones or computers can remotely control lights and electronic devices at home.

Another objective of the invention is to provide a wireless single hot wire smart switch, in which the electrical power supplied to the wireless control module is not from the electrical current flowing through the load.

Still another objective of the invention is to provide a wireless single hot wire smart switch which is capable of detecting energy level of a power storage module of the wireless switch, so that the power consumption of the load can be reported.

According to one aspect of the invention, a wireless switch is provided. The wireless switch comprises a mechanical switch, an electronic switch module, a charger module, a power storage module, and a wireless control module. The mechanical switch comprises a power switch. The power switch is connected to a hot wire. The electronic switch module is connected to the hot wire. The electronic switch module is connected to the mechanical switch in parallel. The charger module is connected to the mechanical switch and the electronic switch module. The power storage module is connected to the charger module. The wireless control module is connected to the charger module. When one of the mechanical switch and the electronic switch module is turned on, the power storage module is charged through the charger module.

According to another aspect of the invention, a wireless switch is provided. The wireless switch comprises a mechanical switch, an electronic switch module, a charger module, a power storage module, and a wireless control module. The mechanical switch comprises a power switch. The power switch is connected to a hot wire. The electronic switch module is connected to the hot wire. The electronic switch module is connected to the mechanical switch in parallel. The charger module is connected to the mechanical switch and the electronic switch module. The power storage module is connected to the charger module. The wireless control module is connected to the power storage module. The wireless control module comprises a micro controller unit. When an energy level stored in the power storage module is lower than a lower limit level, the micro controller unit turns on the electronic switch module.

According to still another embodiment of the invention, a wireless switch is provided. The wireless switch comprises a mechanical switch, a first electronic switch module, a second electronic switch module, a charger module, and a power storage module. The mechanical switch comprises a power switch. The power switch is connected to a hot wire. The first electronic switch module is connected to the hot wire. The first electronic switch module is connected to the mechanical switch. The second electronic switch module is connected between the hot wire and the wireless control module. The charger module is connected to the mechanical switch and the first electronic switch module. The power storage module is connected to the charger module. When the second electronic switch module is turned on, the wireless control module uses electrical power from the second electronic switch module, rather than using electrical power from the power storage module.

DETAILED DESCRIPTION OF THE INVENTION

Figure 1:
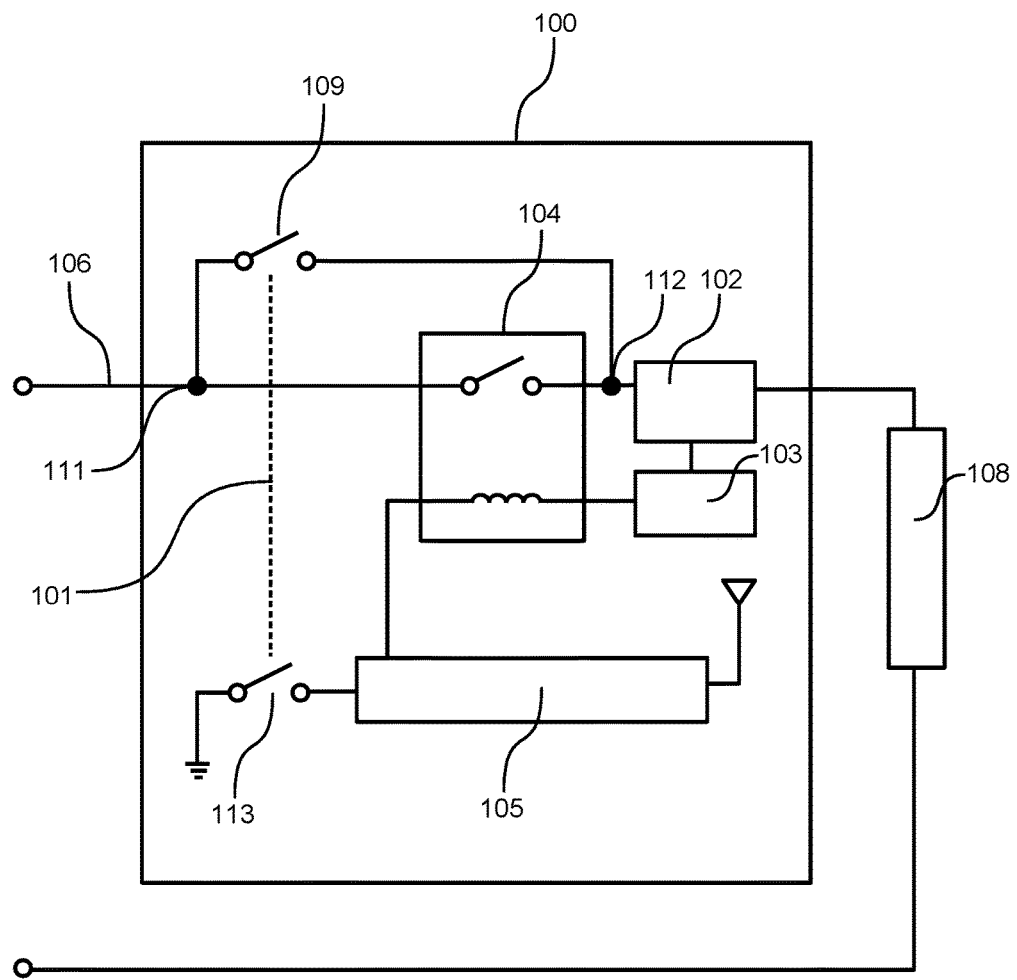
FIG. 1 shows an embodiment of a single hot wire smart switch.

FIG. 1 shows an embodiment of a single hot wire smart switch. Referring to FIG. 1, according to an embodiment of the invention, a wireless single hot wire smart switch 100 comprises a mechanical switch 101, a charging module 102, a power storage module 103, an electronic switch module 104, and a wireless control module 105. The charging module 102 is connected to the power storage module 103. The power storage module 103 is connected to the wireless control module 105. The mechanical switch 101 comprises a power switch 109 and a ground switch 113. In some embodiments, the power switch 109 and the ground switch 113 are switched on and off concurrently. The charging module 102 is connected to the power switch 109 of the mechanical switch 101. The charging module 102 also connects to the electronic switch module 104. The wireless single hot wire smart switch 100 is connected to a load 108. In some embodiments, the load 108 is a home electronic device, such as a television or a light.

When the power switch 109 is turned on, the charging module 102 can get electrical power from the power switch 109 and charge the power storage module 103. When the electronic switch module 104 is turned on, the charging module 102 can get electrical power from the electric switch module 104 and charge the power storage module 103. In some embodiments, the electronic switch module 104 and the power switch 109 of the mechanical switch 101 are connected in parallel. That is, a terminal of the power switch 109 is connected to a first node 111 and the other terminal of the power switch 109 is connected to a second node 112.

A terminal of the electronic switch module 104 is connected to the first node 111 and the other terminal of the electronic switch module 104 is connected the the second node 112. The first node 111 is the position where a hot wire 106 enters.

The electronic switch module 104 can be a combination of relays, Triac (Triode for Alternating Current), MOS (Metal Oxide Semiconductor), IGBT (Insulated Gate Bipolar Transistor), or BJT (Bipolar Junction Transistor). The wireless control module 105 can be Zigbee, BLE (Bluetooth Low Energy), Z-wave, Wi-Fi, ULE (Ultra Low Energy), or 433M wireless module.

According to one embodiment of the invention, when the wireless single hot wire smart switch 100 is firstly installed, the user can switch on the mechanical switch 101. The charging module 102 gets electrical power from the hot wire 106 through the mechanical switch 101 and charges the power storage module 103. When the power storage module 103 gets sufficient electrical energy, for example, higher than a lower limit level, the power storage module 103 is capable of providing power supply to the wireless control module 105. In some embodiments, the power storage module 103 is charged before a customer's installation, so that the power storage module 103 has sufficient power to supply to the wireless control module 105. In this situation, after the first installation, the user does not need to switch on the mechanical switch 101 since the power storage module 103 already has sufficient power to supply to the electronic switch module 104 and the wireless control module 105. The electronic switch 104 and the wireless control module 105 can thus operate normally.

In some embodiments, before a customer's installation, the electronic switch module 104 is set to switch on. After the first installation, even if the mechanical switch 101 is switched off, the electronic switch module 104 still can get electrical power for the charging module 102 and, in the mean time, charges the power storage module 103. In this way, the wireless control module 105 can get power supply and work normally in first installation.

In some embodiments, when the mechanical switch 101 is turned off and the electronic switch module 104 is also turned off, the charging module 102 detects the remaining energy level of the power storage module 103. When the detected energy level is lower than a lower limit level, the charging module 102 makes the electronic switch module 104 turn on so that the charging module 102 can get electrical power and charge the power storage module 103. In some embodiments, when the mechanical switch 101 is turned off and the electronic switch module 104 is also turned off, the wireless control module 105 detects the remaining energy level of the power storage module 103. When the remaining energy level is lower than the lower limit level, the wireless control module 105 makes the electronic switch module 104 turn on so that the charging module 102 can get electrical power and charges the power storage module 103.

Figure 2:
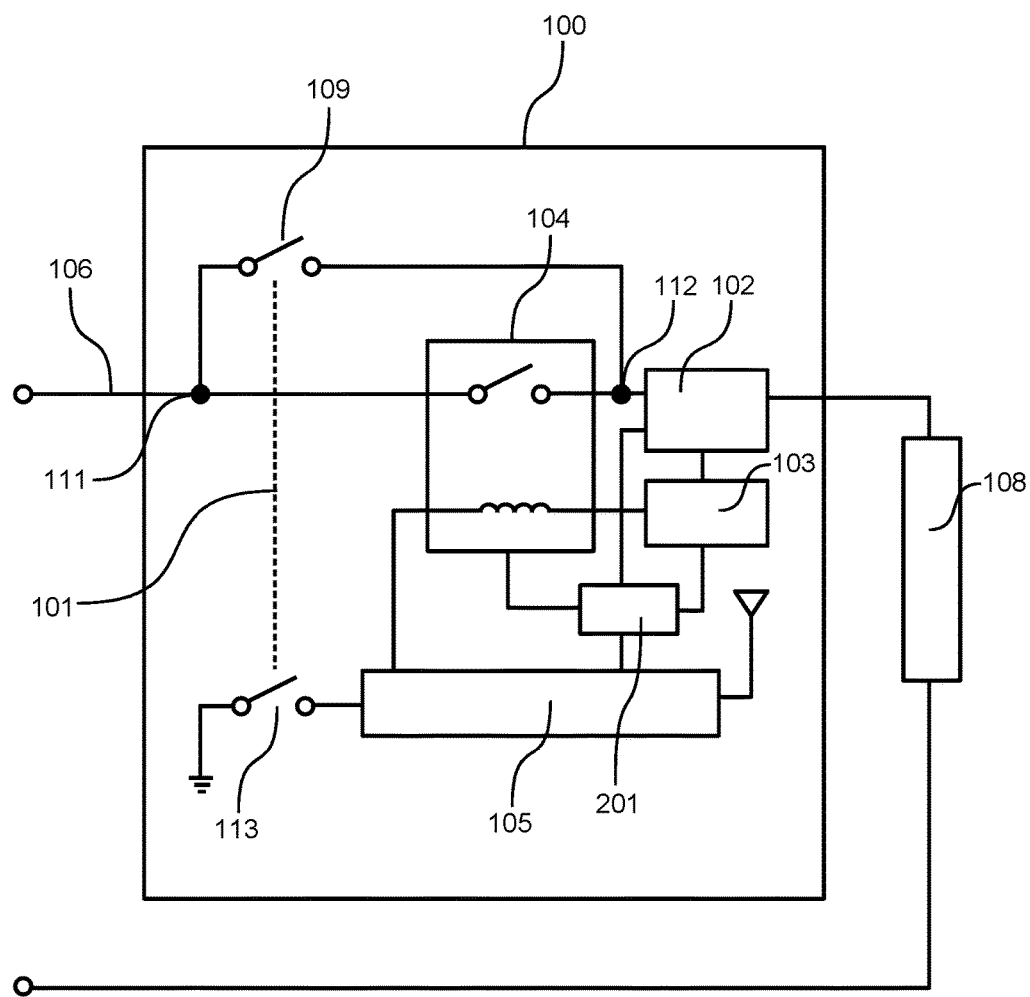
FIG. 2 shows another embodiment of a single hot wire smart switch.

FIG. 2 shows another embodiment of a single hot wire smart switch. Referring to FIG. 2, the single hot wire smart switch 100 is similar to that of FIG. 1, differing in that the single hot wire smart switch 100 of FIG. 2 comprises an MCU (Micro Controller Unit) 201. The MCU 201 is connected to the power storage module 103, the electronic switch module 104, and the wireless control module 105. The MCU 201 can detect whether the energy level stored in the power storage module 103 is sufficient to let the wireless control module 105 work properly. If the MCU 201 determines that the energy level stored in the power storage module 103 is lower than a first lower limit level, the MCU 201 makes the electronic switch 104 turn on so that the electronic switch module 104 can charge the power storage module 103. On the other hand, if the MCU 201 determines that the energy level stored in the power storage module 103 is lower than a second lower limit level, the MCU 201 can turn off the operation of the wireless control module 105 or let the wireless control module 105 enter a suspend mode, waiting for the power storage module 103 to charge. In some embodiments, the first lower limit level is the same as the second lower limit level. When the power storage module 103 is charged to a normal level, the wireless control module 105 can let the wireless control module 105 resume from the suspend mode. The suspend mode of the wireless control module 105 includes suspending wireless communications to save power. In some embodiments, the first lower limit level, the second lower limit level, and the normal level are of the same value. In some embodiments, the MCU 201 is connected to the charging module 102, and the MCU can know whether the mechanical switch 101 is turned on. Either of the situations where the mechanical switch 101 is turned on or the electronic switch module 104 is turned on can help charge the power storage module 103. Therefore, in some embodiments, when the MCU 201 knows that the mechanical switch 101 is turned on, it can turn off the electronic switch module 104 and the power storage module 103 can still be charged through the charging module 102 and the mechanical switch 101.

In some embodiments, the power storage module 103 can be a super capacitor or a rechargeable battery. The power storage module 103 can overcome the problem of insufficient power supply to the wireless control module 105 in first installation or after the mechanical switch 101 has been turned off for a long time. The wireless single hot wire smart switch 100 can make sure that the wireless control module 105 and the electronic switch module 104 work normally.

Figure 3:
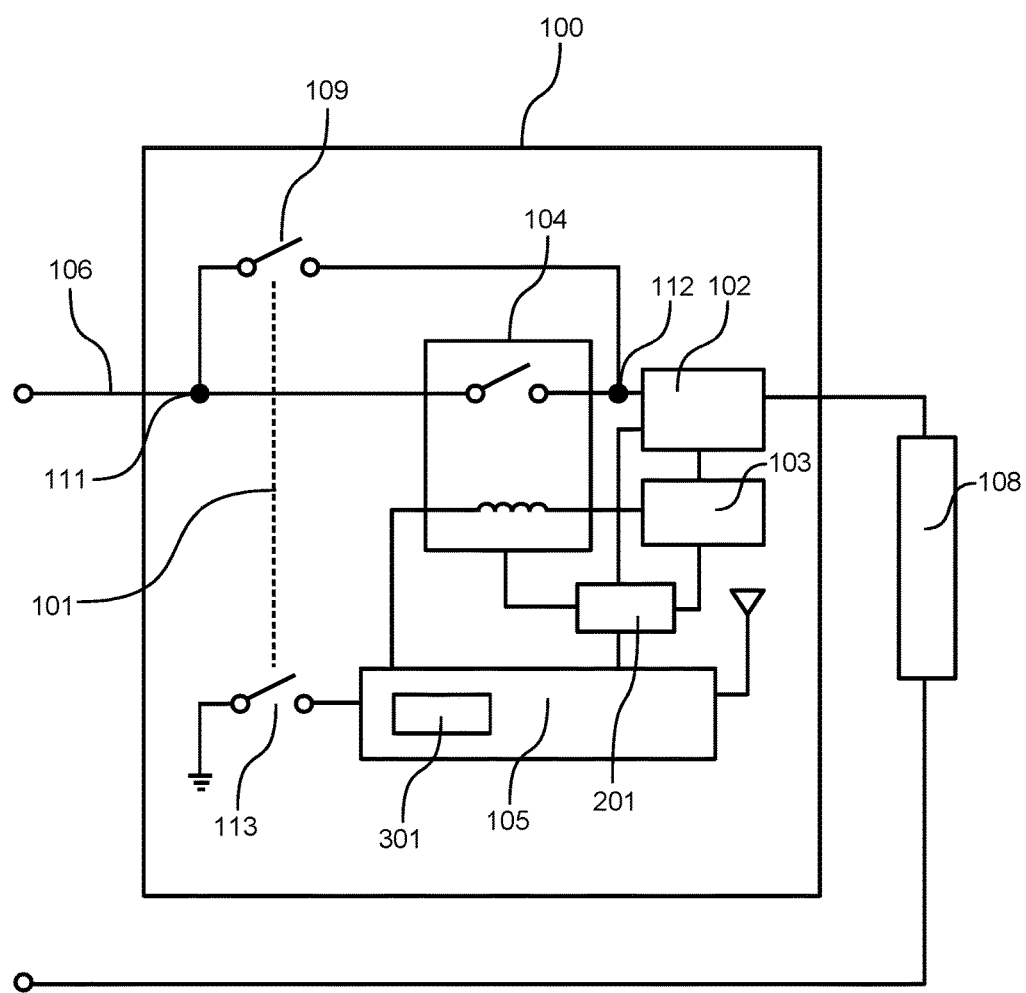
FIG. 3 shows another embodiment of a wireless single hot wire smart switch.

FIG. 3 shows another embodiment of a wireless single hot wire smart switch. Referring to FIG. 3, the wireless single hot wire smart switch 100 further comprises a memory 301. The memory 301 can be implemented in the wireless control module 105 or in the MCU 201. The memory 301 can be implemented separately. In some embodiments, the MCU 201 or the wireless control module 105 stores power data of the power storage module 103 into the memory 301. In some embodiments, the wireless control module 105 transmits the power data to a mobile station through mobile communications. The power data can include electrical energy status or energy level of the power storage module 103. For example, the power data can show whether the energy level of the power storage module 103 is sufficient or not sufficient, or whether the power storage module 103 is charging or discharging. The user can receive the power data through a cell phone to instantly know the power level of the power storage module 103 and the status of charging or discharging. In some embodiments, the memory 301 stores the switching status (on or off) of the electronic switch module 104. The wireless control module 105 transmits the switching status to the user's cell phone so that the user can know whether the electronic switch module 104 is on or off now.

Figure 4:
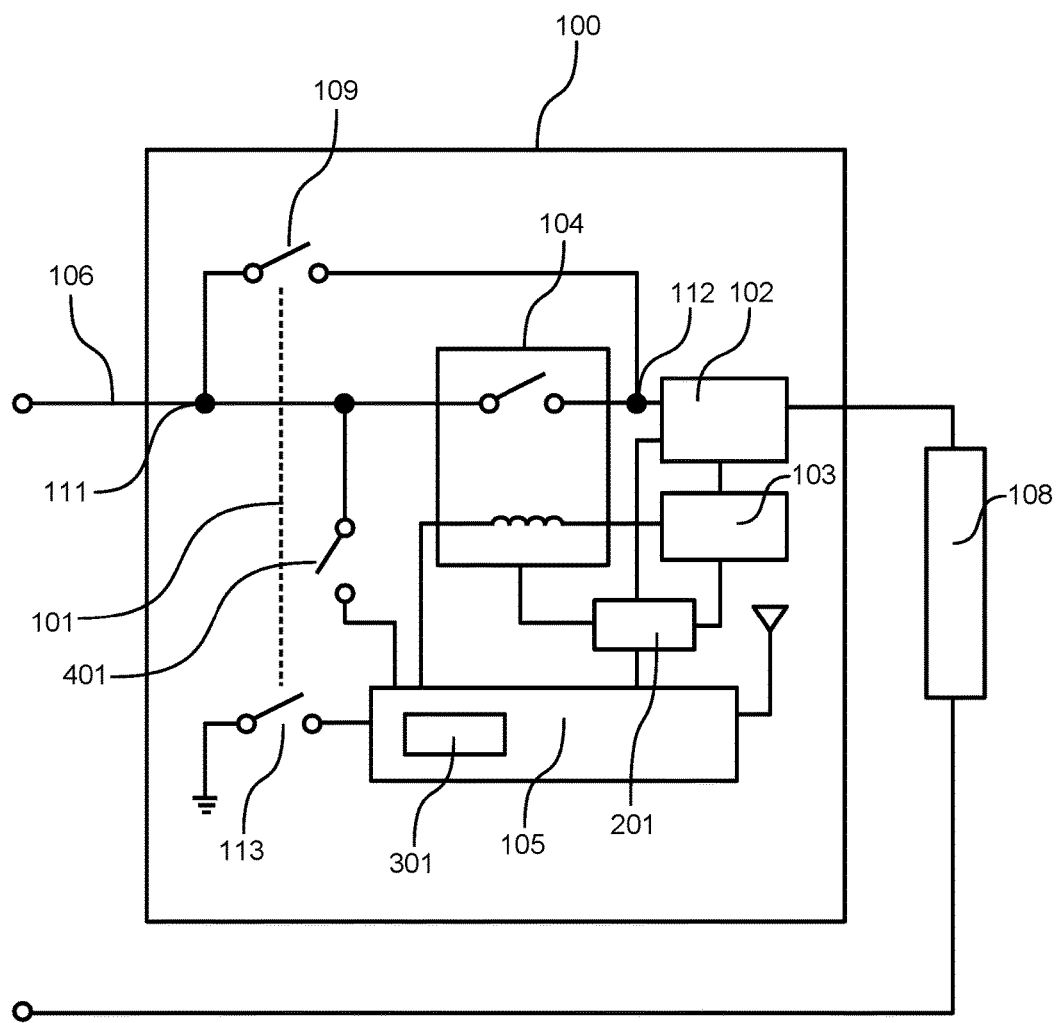
FIG. 4 shows another example of a wireless single hot wire smart switch.

FIG. 4 shows another example of a wireless single hot wire smart switch. Referring to FIG. 4, the wireless single hot wire smart switch 100 comprises a first electronic switch module 104 and a second electronic switch module 401. The second electronic switch module 401 is connected between a hot wire 106 and the wireless control module 105. When the second electronic switch module 401 is turned on, the wireless control module 105 uses the electrical power from the second electronic switch module 401 rather than the electrical power from the power storage module 103. In some embodiments, when the energy level of the power storage module 103 is lower than a lower limit level, the first electronic switch module 104 and the second electronic switch module 401 are turned on concurrently. The first electronic switch module 104 supplies electrical power to the charging module 102 and the load 108, whereas the second electronic switch module 401 supplies electrical power to the wireless control module 105. In some embodiments, when the electronic switch module 104 is turned on, the charging module 102 has a first mode and a second mode. In the first mode, the charging module supplies electrical power to the load 108 and the power storage module 103. In the second mode, the charging module 102 supplies electrical power to the power storage module 103, and does not supply electrical power to the load 108. In some embodiments, the MCU 201 is connected to the second electronic switch module 401. The MCU 201 is capable of controlling the second electronic switch 401.

When the wireless single hot wire smart switch 100 is installed for the first time, the user can download a corresponding application for cell phones to control the wireless single hot wire smart switch 100. In some embodiments, a bar code can be attached onto the wireless single hot wire smart switch 100 and a cell phone with the corresponding application can scan the barcode to connect the cell phone to the smart switch 100. In some embodiments, the wireless single hot wire smart switch 100 itself can transmit a piece of identification signal for the cell phone to receive, and the application of the cell phone can proceed with an identification process. When the identification process is passed, the cell phone can be connected to the wireless single hot wire smart switch 100 wirelessly. The identification signal can be any one protocol of ZigBee, BLE (Bluetooth Low Energy), Z-wave, Wi-Fi, ULE (Ultra Low Energy), or 433 MHz (433 Mega Hertz). The above mentioned cell phones can be replaced by other mobile devices like tablet computers.

The wireless single hot wire smart switch 100 is easy to install, and can directly replace traditional switches on walls without much modifications to circuits. The wireless control module 105 in the wireless single hot wire smart switch 100 can be wirelessly connected to cell phones easily. The wireless single hot wire smart switch 100 can be incorporated into a wireless smart network system, in which cell phones or computers can remotely control lights and electronic devices at home. In some embodiments, the wireless control module 105 has a function of detecting energy level, so that the power consumption of the load can be reported. The electrical power supplied to the wireless control module 105 is not from the electrical current flowing through the load 108, so the blinking or flickering effect of a traditional light can be avoided. The dull glow emitted by an incandescent lamp when the lamp is switched off using a traditional switch can also be avoided. The embodiments of the invention use single hot wire power supply techniques and wireless communication techniques to solve the problems of traditional smart switches, such as high power consumption, high cost, poor wireless capability, short transmission distance, low safety, and small number of lights that can be controlled.

The invention claimed is:
1. A wireless switch, comprising
   a mechanical switch, the mechanical switch comprising a power switch, the power switch being connected to a hot wire;
   an electronic switch module, the electronic switch module being connected to the hot wire, the electronic switch module being connected to the mechanical switch in parallel;
   a charger module, the charger module being connected to the mechanical switch and the electronic switch module;
   a power storage module, the power storage module being connected to the charger module; and
   a wireless control module, the wireless control module being connected to the power storage module, the wireless control module comprising a micro controller unit;
   wherein when an energy level stored in the power storage module is lower than a lower limit level, the micro controller unit turns on the electronic switch module.

2. The wireless switch of claim 1, wherein when the energy level stored in the power storage module is higher than the lower limit level, the power storage module is capable of supplying electrical power to the wireless control module.

3. The wireless switch of claim 1, wherein the wireless control module comprises a memory for storing power data of the power storage module, and the power data comprises a value of electrical energy stored in the power storage module.

4. The wireless switch of claim 1, wherein the electronic switch module is a first electronic switch module, the wireless control module further comprise a second electronic switch module, the second electronic switch module is connected between the hot wire and the wireless control module, and when the second electronic switch module is turned on, the wireless control module uses electrical power from the second electronic switch module, rather than using electrical power from the power storage module.

5. The wireless switch of claim 4, wherein when the energy level stored in the power storage module is lower than a lower limit level, the first electronic switch module and the second electronic switch module are turned on concurrently.

6. The wireless switch of claim 1, wherein when the electronic switch module is turned on, the charging module has a first mode and a second mode, in the first mode, the charger module supplies electrical power to the power storage module and a load, and in the second mode, the charger module supplies electrical power to the power storage module, not to the load.

7. A wireless switch, comprising:
   a mechanical switch, the mechanical switch comprising a power switch, the power switch being connected to a hot wire;
   a first electronic switch module, the first electronic switch module being connected to the hot wire, the first electronic switch module being connected to the mechanical switch;
   a second electronic switch module, the second electronic switch module being connected between the hot wire and a wireless control module;
   a charger module, the charger module being connected to the mechanical switch and the first electronic switch module; and
   a power storage module, the power storage module being connected to the charger module;
   wherein when the second electronic switch module is turned on, the wireless control module receives electrical power from the second electronic switch module.

8. The wireless switch of claim 7, wherein when an energy level of the power storage module is lower than a lower limit level, the first electronic switch module and the second electronic switch module are turned on concurrently.

9. The wireless switch of claim 7, wherein when the energy level stored in the power storage module is higher than a lower limit level, the power storage module is capable of supplying electrical power to the wireless control module.

10. The wireless switch of claim 7, further comprising a micro controller unit, the micro controller unit being connected to the power storage module, the first electronic switch module, the second electronic switch module, and the wireless control module, wherein when an energy level of the power storage module is lower than a lower limit level, the micro controller unit turns on the first electronic switch module to charge the power storage module.

11. The wireless switch of claim 7, wherein the wireless control module comprises a memory for storing power data of the power storage module, and the power data comprises a value of electrical energy stored in the power storage module.

12. The wireless switch of claim 7, wherein when the first electronic switch module is turned on, the charging module has a first mode and a second mode, in the first mode, the charger module supplies electrical power to the power storage module and a load, and in the second mode, the charger module supplies electrical power to the power storage module, not to the load.

13. The wireless switch of claim 7, wherein the power storage module is a rechargeable battery.

* * * * *